Patented Oct. 22, 1929

1,732,240

UNITED STATES PATENT OFFICE

ALAN W. C. MENZIES, OF PRINCETON, NEW JERSEY

INSECTICIDAL SOLUTION

No Drawing.   Application filed February 7, 1927. Serial No. 166,591.

This invention relates to liquid compositions which may be applied to woolen or other goods to protect them against damage by the larvæ of clothes moths, buffalo moths, and other insects or organisms which attack such goods.

An object of the invention is to provide an efficient liquid insecticide and mothproofing composition which will penetrate quickly and thoroughly into the body of fabrics and other goods to be protected.

Such a composition must thus possess two properties, namely, first, the property of quickly and thoroughly penetrating into the materials to be protected, and, second, the property of making such materials poisonous or repellant to the damaging organisms. According to the invention, these properties may be imparted to an inert volatile liquid, such as water, by the addition to it of an ingredient which confers both the desirable properties, or of two or more ingredients which share the task of conferring the two properties desired.

In its preferred form the composition of this invention comprises a volatile solvent, such as water, containing a non-volatile ingredient which is poisonous or repellant to the damaging organisms, and another ingredient which has the property of promoting the penetration of the goods by the solution or the absorption of the solution by the goods.

Since the protective liquid is to be used in treating garments and household articles it is evident that it must be substantially harmless to man. This requirement prohibits the use of numerous insecticidal substances used in agriculture and horticulture against the larvæ, mites, beetles and other organisms that infest living plants and animals.

Substances which are suitable as the insecticidal ingredient of the present invention are certain fluorides and silicofluorides which are not only poisonous to the damaging organisms and harmless to man, but are also non-volatile and hence produce a lasting effect upon the article treated. Specific examples of such insecticidal ingredients are sodium fluoride and sodium silicofluoride.

Sodium taurocholate is likewise non-volatile and has insecticidal properties, which may be enhanced by the addition of toxic chemical atoms or groups of atoms to its molecule. Sodium taurocholate not only possesses insecticidal properties but also, as hereinafter described, greatly enhances the rapid penetration of the liquid in which it is dissolved, and will thus serve a dual purpose in the solution.

In the preferred form of the invention, however, a second ingredient is employed, in addition to the insecticidal ingredient, to promote the rapid and thorough penetration of the solution into the goods to which it is applied. Aqueous or other volatile solutions containing only sodium fluoride, sodium aluminium silicofluoride or other insecticides do not penetrate rapidly into the body of the goods, and hence if the solvent evaporates rapidly, the insecticidal ingredient is deposited mainly on the surface where it is readily brushed off by friction. I have found, however, that certain substances, which markedly lower the surface tension (measured statically) of the solvent, enable the insecticidal solution to penetrate fabrics and other goods with remarkable facility. These substances, in concentrations of 0.5% or less, lower the surface tension of water by over 50%. This class of substances includes the saponins, soaps, the bile salts and certain sulphonic acids. Soap, however, would be precipitated in solutions having an acid reaction, such as those containing fluorides or silicofluorides.

A specific example of an effective liquid insecticide which fulfills the requirements outlined above is an aqueous solution containing 0.5% of sodium fluoride and 0.2% of a mixture of the bile salts sodium taurocholate and sodium glycocholate. This is a stable, colorless, odorless and nonstaining liquid. When placed on woolen cloth in drops, for example by means of a pipette, it will penetrate into the cloth about twenty times faster than does plain water, or a 0.5% solution of sodium fluoride or a 0.5% solution of sodium silicofluoride.

When an aqueous mothproofing solution is applied to cloth by a process of spraying, the droplets that fall on the surface of the cloth have, by reason of their minute size, a very large surface in relation to their mass, and therefore have a very high speed of evaporation so long as they continue to rest unabsorbed on the surface. The longer they remain unabsorbed by the cloth while continuing rapidly to evaporate, the larger will be the proportion of the deposit of insecticide that is merely superficial. From these considerations the advantage of rapid absorption of the droplets by the cloth is evident, both as to thoroughness and permanence of protection.

The invention is not limited to the particular ingredients or to the specific proportions of ingredients herein described, which may vary widely within the scope of the appended claims.

The invention claimed is:

1. A protective solution comprising a solvent containing a soluble fluoride and a bile salt.

2. An insecticidal composition containing sodium fluoride and sodium taurocholate.

3. An insecticidal composition containing sodium fluoride, sodium taurocholate and sodium glycocholate.

4. An insecticidal composition comprising a volatile solvent containing a soluble fluoride and bile salts.

5. An insecticidal composition comprising an aqueous solution containing sodium fluoride and bile salts.

6. An insecticidal composition comprising an aqueous solution containing sodium fluoride and sodium taurocholate.

7. An insecticidal composition comprising an aqueous solution containing sodium fluoride, sodium taurocholate and sodium glycocholate.

8. An insecticidal composition comprising an aqueous solution containing 1% or less of a soluble fluoride and less than 0.5% of bile salts.

9. An insecticidal composition comprising an aqueous solution containing about 0.5% sodium fluoride and about 0.2% of sodium taurocholate and sodium glycocholate.

Signed at Princeton, in the county of Mercer and State of New Jersey, this thirty first day of January, A. D. 1927.

ALAN W. C. MENZIES.